United States Patent
Hauptmann et al.

(10) Patent No.: US 7,352,776 B1
(45) Date of Patent: *Apr. 1, 2008

(54) LINE TERMINATOR UNIT FOR A SUBSCRIBER LINE

(75) Inventors: Joerg Hauptmann, Wernberg (AT); Paul Kunisch, Puchheim (DE); Hans Werner Rudolf, Munich (DE); Gerald Krottendorfer, Vienna (AT); Manfred Preitnegger, Klagenfurt (AT); Rudi Frenzel, Munich (DE); Markus Terschluse, Munich (DE); Dirk Schmuecking, Villach (AT)

(73) Assignee: Infineon Technologies, AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/806,415

(22) PCT Filed: Sep. 30, 1999

(86) PCT No.: PCT/DE99/03214

§ 371 (c)(1),
(2), (4) Date: Jan. 14, 2003

(87) PCT Pub. No.: WO00/19767

PCT Pub. Date: Apr. 6, 2000

(30) Foreign Application Priority Data

Sep. 30, 1998 (DE) .................. 198 44 941
Aug. 21, 1999 (DE) .................. 299 14 706 U (51) Int. Cl.
*H04J 1/00* (2006.01)
*H04J 1/02* (2006.01)
*H04M 11/00* (2006.01)

(52) U.S. Cl. ............... 370/493; 370/488; 370/497; 379/93.05

(58) Field of Classification Search ............... None
See application file for complete search history.

(56) References Cited

U.S. PATENT DOCUMENTS 4,644,526 A * 2/1987 Wu .......................... 370/295

(Continued)

FOREIGN PATENT DOCUMENTS

EP 0 643 477 A2 9/1994

(Continued)

OTHER PUBLICATIONS

Japanese Examination Report of co-pending Japanese patent application 2000-573126, dated Jun. 11, 2004 and its English translation.

(Continued)

*Primary Examiner*—Kwang Bin Yao
*Assistant Examiner*—Warner Wong
(74) *Attorney, Agent, or Firm*—Welsh & Katz, Ltd.

(57) ABSTRACT

The invention relates to a line terminating device for a subscriber line which transmits and receives broadband signals via a single subscriber line, a broadband signal being composed of a broadband or narrowband audio-frequency data signal and a broadband higher-frequency data signal and the frequency bands of the voice signal and of the data signal essentially not overlapping. The line terminating device according to the invention has a digital frequency separating filter in the digital section of the line terminating device, which is arranged in the digital section of the line terminating device so that the audio-frequency voice signal is separated from the higher-frequency data signal. In particular, the line terminating device is suitable for separating an ISDN or POTS voice signal from an ADSL data signal.

19 Claims, 5 Drawing Sheets

U.S. PATENT DOCUMENTS

| | | | |
|---|---|---|---|
| 5,400,322 A * | 3/1995 | Hunt et al. | 370/468 |
| 5,495,483 A * | 2/1996 | Grube et al. | 370/341 |
| 5,757,803 A * | 5/1998 | Russell et al. | 370/494 |
| 5,781,728 A * | 7/1998 | Rybicki et al. | 709/230 |
| 5,790,539 A * | 8/1998 | Chao et al. | 370/390 |
| 5,841,841 A * | 11/1998 | Dodds et al. | 379/93.08 |
| 5,889,856 A * | 3/1999 | O'Toole et al. | 379/399.02 |
| 5,960,066 A * | 9/1999 | Hartmann et al. | 379/93.08 |
| 5,982,785 A * | 11/1999 | Woerner et al. | 370/488 |
| 6,005,854 A * | 12/1999 | Xu et al. | 370/335 |
| 6,144,659 A | 11/2000 | Nye et al. | |
| 6,414,952 B2 * | 7/2002 | Foley | 370/352 |
| 6,567,519 B1 * | 5/2003 | Ham | 379/372 |
| 6,748,076 B1 * | 6/2004 | Elo | 379/402 |
| 6,925,091 B1 * | 8/2005 | Sjoberg et al. | 370/463 |
| 7,164,708 B1 * | 1/2007 | Hauptmann et al. | 375/222 |

FOREIGN PATENT DOCUMENTS

| | | |
|---|---|---|
| EP | 0643477 | 3/1995 |
| EP | 0 795 977 A2 | 2/1997 |
| EP | 0795977 | 9/1997 |
| EP | 0 840 474 A2 | 10/1997 |
| EP | 0840474 | 5/1998 |
| EP | 0923221 | 6/1999 |
| JP | 6-205452 | 7/1994 |
| JP | 10-210510 | 8/1998 |
| JP | 11-285035 | 10/1999 |
| WO | WO 97/20396 | 11/1996 |
| WO | WO 9720396 | 6/1997 |
| WO | WO 98/32241 | 1/1998 |
| WO | WO 9832241 | 7/1998 |

OTHER PUBLICATIONS

"Transceiver for ISDN Subscriber Loops", International Conference on Communications (ICC '89), IEEE, Jun. 1989, pp. 228-232.

* cited by examiner

LINE TERMINATOR UNIT FOR A SUBSCRIBER LINE

The invention relates to a line terminating device according to the precharacterizing clause of Claim 1, that is to say a line terminating device for a subscriber line which transmits and receives broadband signals via a single subscriber line, a broadband signal being composed of a broadband or narrowband audio-frequency voice signal and a broadband higher-frequency data signal and the frequency bands of the voice signal and of the data signal essentially not overlapping.

Voice transmission via an analogue subscriber line in the telephone network is analogue. Whereas only a relatively narrow frequency band, the so-called voice band, could be used for voice transmission in a conventional voice transmission system such as the so-called POTS (Plain Old Telephone System), voice transmission in more recent ISDN systems uses a relatively wide frequency band.

In the current xDSL (x Digital Subscriber Line) transmission methods, the frequency ranges above the voice band are also used for broadband data transmission in the telephone network. By xDSL transmission methods, HDSL (High Bit Rate Digital Subscriber Line), ADSL (Asynchronous Digital Subscriber Line) and VDSL (Very High Speed Digital Subscriber Line) transmission methods are meant. The xDSL transmission methods are called broadband network access and comprise all transmission methods via the telephone network which provide for a higher data transmission rate between a subscriber and the exchange than the data transmission rate which can be achieved by means of voice band modems. To this end, a so-called xDSL data signal which designates a digital signal coded for the xDSL transmission method is transmitted in a higher frequency band separate from the voice band in the xDSL transmission methods. The xDSL transmission methods can theoretically use the entire bandwidth of the twin copper wire available above the voice band and achieve data transmission rates in the Mbps range.

In spite of the separate transmission of voice and data in different frequency ranges in the xDSL transmission methods, secondary frequencies from the voice band can get into the data band and vice vesa. Control signals in the voice band such as, for example, ringing signals or meter pulses, in particular, can cause interference in the data band and interrupt or even completely abort the data transmission.

To avoid such interference, the voice band and the data band must be separated before further processing. For this purpose, frequency separating filters, so-called POTS splitters, are needed which separate a broadband signal into a narrowband audio-frequency voice signal and a broadband higher-frequency data signal at the receiving end and filter voice signals and data signals and combine them to form a broadband signal at the transmitting end.

In U.S. Pat. No. 5,757,803, a POTS splitter is described which has a low-pass filter and two capacitances, the low-pass filter having a pass band for the voice band and precedes an analogue subscriber terminal and the two capacitances suppressing control signals from the voice band and preceding an xDSL transceiver. In the xDSL transceiver, which is connected to a subscriber line via the two capacitances, there are further analogue high-pass filters which, together with the two capacitances, separate the data band from the voice band.

From U.S. Pat. No. 5,742,527, an ADSL transceiver is known which receives and transmits a broadband signal via a subscriber line and filters an analogue voice signal out of the received signal by means of a band-pass filter. An ADSL signal to be transmitted is also filtered by means of a band-pass filter in order to remove interfering frequencies which can get into the voice band from the ADSL signal, from the voice band so that the voice band transmission is not influenced. The ADSL receiver has an analogue/digital converter and a decimator following the analogue/digital converter, which decimator filters an ISDN signal present in the signal out of the received signal. The ADSL transmitter has an interpolator with high-pass filter function which, preceding a digital/analogue converter, filters interfering frequencies located in the voice band out of an ADSL signal to be transmitted.

The abovementioned solutions, however, always require analogue filters which are formed by active and/or passive elements. Since steep filtering edges are required for separating the voice and data band, higher-order analogue filters are needed which are very complex and expensive as analogue filters. Furthermore, a solution involving analogue filters can be adapted to changes in the specification only with difficulties, for example if the separating frequency between voice and data band changes.

The present invention relates, in particular, to the combining at the transmitting end and the separating at the receiving end of two or more signal streams of different transmission methods located in separate frequency ranges such as, for example ADSL and ISDN, for transmission on the same transmission medium, for example a subscriber line.

In current line terminating devices for subscriber lines, the individual signal streams are treated in separate transceiver units in each case. As already mentioned, the signal streams are combined or separated, respectively, by so-called splitter circuits or frequency separating filters which terminate the subscriber lines at both ends and in each case provide an interface for the signal streams of the individual transmission methods. Generic splitter circuits according to the prior art are constructed as passive analogue filters. In the ideal case, these splitter circuits are transparent for the transceivers for generating and receiving the signal streams. In fact, however, these splitter modules considerably impair the transmission characteristic of the individual services or transmission methods, respectively, since the filter frequency responses can never be implemented with an ideal frequency and phase response, i.e. in practice, the frequency ranges can never be completely separated from each other without any reaction. For example, a common operation of ADSL and ISDN typically produces a reduction in the ISDN range whereas the ADSL service achieves a lower data rate with the same line length.

On the basis of this prior art, the present invention is, therefore, based on the technical object of providing a generic line terminating device for a subscriber line which offers a simple solution for separating voice and data band which can be adapted by including changes in specification.

According to the invention, this object is achieved by a line terminating device for a subscriber line having the features of Claim 1.

Accordingly, a line terminating device for a subscriber line is provided which is characterized by a digital frequency separating filter which separates the audio-frequency voice signal and the higher-frequency data signal from each other and which is arranged in the digital section of the line terminating device.

Advantageous embodiments and further developments of the invention are found in the respective subclaims.

The broadband received signal is advantageously split into a first digital voice signal and a first digital data signal by digital means which provide for better and more rapid adaptability to changing specifications relating to the separating frequency of the frequency separating filter, than analogue means.

The line terminating device can be arranged both in, for example, an ADSL transceiver at a subscriber and in an exchange (CO=Central Office) on a line connection card.

In the exchange, the line terminating device follows a subscriber line interface circuit (SLIC). The subscriber line interface circuit supplies the subscriber line with a line current.

At the subscriber, a transformer circuit can couple the subscriber line to the line terminating device. In one particularly preferred embodiment, the digital frequency separating filter has a first digital low-pass filter and a first digital high-pass filter, the first digital low-pass filter and the first digital high-pass filter being supplied with the digital received signal. Furthermore, the digital frequency separating filter has a second digital low-pass filter and a second digital high-pass filter and a digital adder, the second digital voice signal being supplied to the second digital low-pass filter and the second digital data signal being supplied to the second digital high-pass filter and the digital adder adding the output signal of the second digital low-pass filter and of the second digital high-pass filter to form the digital transmit signal.

In one particularly preferred embodiment, the first digital low-pass filter has a first series circuit of at least one first decimation filter and the first digital high-pass filter has a second series circuit of at least one second decimation filter. Advantageously, decimation filters enable the sampling rate of digital signals to be reduced and match the sampling rate of the first digital voice signal and the sampling rate of the first digital data signal to the sampling rates of a subsequent digital voice-processing facility or, respectively, a subsequent digital data-processing facility.

In another especially preferred embodiment, the second digital low-pass filter has a third series circuit of at least one first interpolation filter and the second digital high-pass filter has a fourth series circuit of at least one second interpolation filter. Interpolation filters advantageously increase the sampling rate of digital signals and thus match the sampling rate of the second digital voice signal and of the second digital data signal to the sampling rate of the subsequent digital/analogue converter.

In one preferred embodiment, the digital frequency separating filter has a noise shaper filter which follows the digital adder. The noise shaper filter advantageously matches the word width of the digital transmit signal to the processing word width of the digital/analogue converter.

In a particularly preferred embodiment, an oversampling analogue/digital converter operating in accordance with the sigma/delta method is used as analogue/digital converter. The advantages here are the high sampling frequency which enables a low-order antialiasing filter to be used preceding the analogue/digital converter and thus provides for a simple structure. As a result, the antialiasing filter can be included in the integration when the line terminating device is constructed in an integrated circuit.

The first digital low-pass filter, the first digital high-pass filter, the second digital low-pass filter and the second digital high-pass filter are in the form of programs in a digital signal processor in another preferred embodiment. Thus, the filter function can be advantageously matched to changes in the specification with respect to the separating frequencies of the first digital voice signal and the first digital data signal by means of a program change.

In another especially preferred embodiment, the analogue/digital converter is preceded by an automatic gain control circuit for controlling the amplitude of the received broadband analogue signal. This advantageously amplifies frequencies of the data band and attenuates frequencies of the voice band. The frequencies of the data band are attenuated more than the frequencies of the voice band during the transmission via the subscriber line.

The digital/analogue converter is followed by a power matching circuit for matching the power spectrum distribution in another especially preferred embodiment. The power matching circuit amplifies frequencies with low spectral power and attenuates frequencies with high spectral power. After the matching of the power spectrum distribution, the spectral power is advantageously more uniformly distributed over the voice and data band.

The special advantage of the line terminating device according to the invention lies in shifting the splitter functions from the analogue domain to the digital domain. This is made possible by operating the individual transmission methods sharing the same subscriber line in clock-controlled synchronism.

Furthermore, the different impedance requirements can be implemented over the entire relevant frequency range by suitable frequency-dependent external circuitry at the analogue front end. A further possibility for achieving the required impedance variation of the line interface consists in using impedance synthesis loops in the analogue front end.

Shifting the splitter functions from the analogue domain into the digital domain of the transceivers make the transceiver circuits of the individual transmission methods no longer completely independent of one another. Among other things, they use a common analogue front end. The common transmit/received signal is combined or, respectively, separated with respect to frequency by using generally known digital filter algorithms in a digital splitter module. Attention should be paid to the fact that the sample rates of the individual streams should be identical at the summation point or, respectively, at the splitting point. This is achieved by sample rate adaptation stages and a clock synchronization unit in the digital splitter modules.

A digital splitter module can be used at both ends of the subscriber line in the systems, i.e. both at the subscriber end and at the network end.

Due to the line terminating device with separation of data and voice band in the digital section according to the invention, the following advantages are achieved:

The invention allows the analogue splitter module to be replaced by a digital splitter module. The digital splitter module can be implemented in a single integrated circuit (IC) simultaneously for a number of channels per chip. The construction of a passive analogue splitter, in contrast, requires considerable space since coils and capacitors with in some cases withstand stringent voltage requirements and component tolerance must be used. Depending on the construction, the costs differ by a multiple to the disadvantage of the analogue solution.

Only a single common analogue front end is advantageously needed for all transmission methods sharing a subscriber line whereas in current solutions, each transceiver must contain an analogue front end. This results in a significant cost reduction.

The characteristics of digital filters can meet much stricter requirements with respect to edge steepness and minimum group delay distortions. A system with a digital splitter can, therefore, be optimized in such a manner that it is subject to lower losses of performance than a comparable system with analogue splitter. Furthermore, the circuit is also more advantageous with regard to the EMC emission caused by clock edges being too steep.

Crosstalk between the individual transmission methods due to inadequate out-of-band attenuation can be distinctly reduced by using echo canceller modules in digital splitter modules. This leads to a further reduction in performance losses which can arise when a number of transmission methods are operated jointly on the same subscriber line.

Due to the clock synchronization according to the invention, additional services such as, for example, the so-called "Voice over IP" can manage without further clock synchronization in the ADSL service.

Further advantages, features and possible applications of the invention are found in the subsequent description of illustrative embodiments in conjunction with the drawing, in which.

Figure 1:
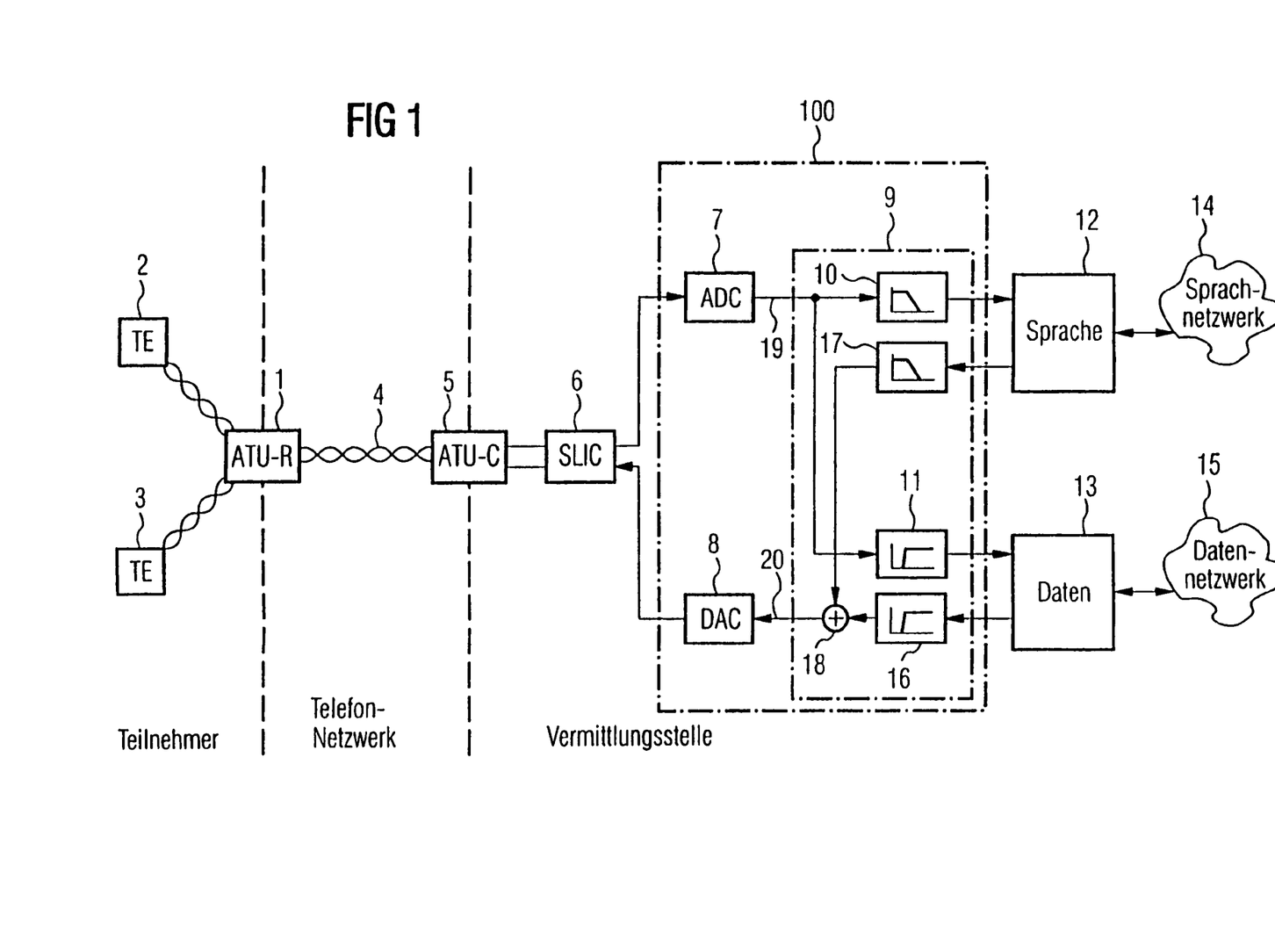
FIG. 1 shows the configuration of a transmission link between a subscriber and an exchange with a first illustrative embodiment of the line terminating device for a subscriber line according to the invention.
Figure 2:
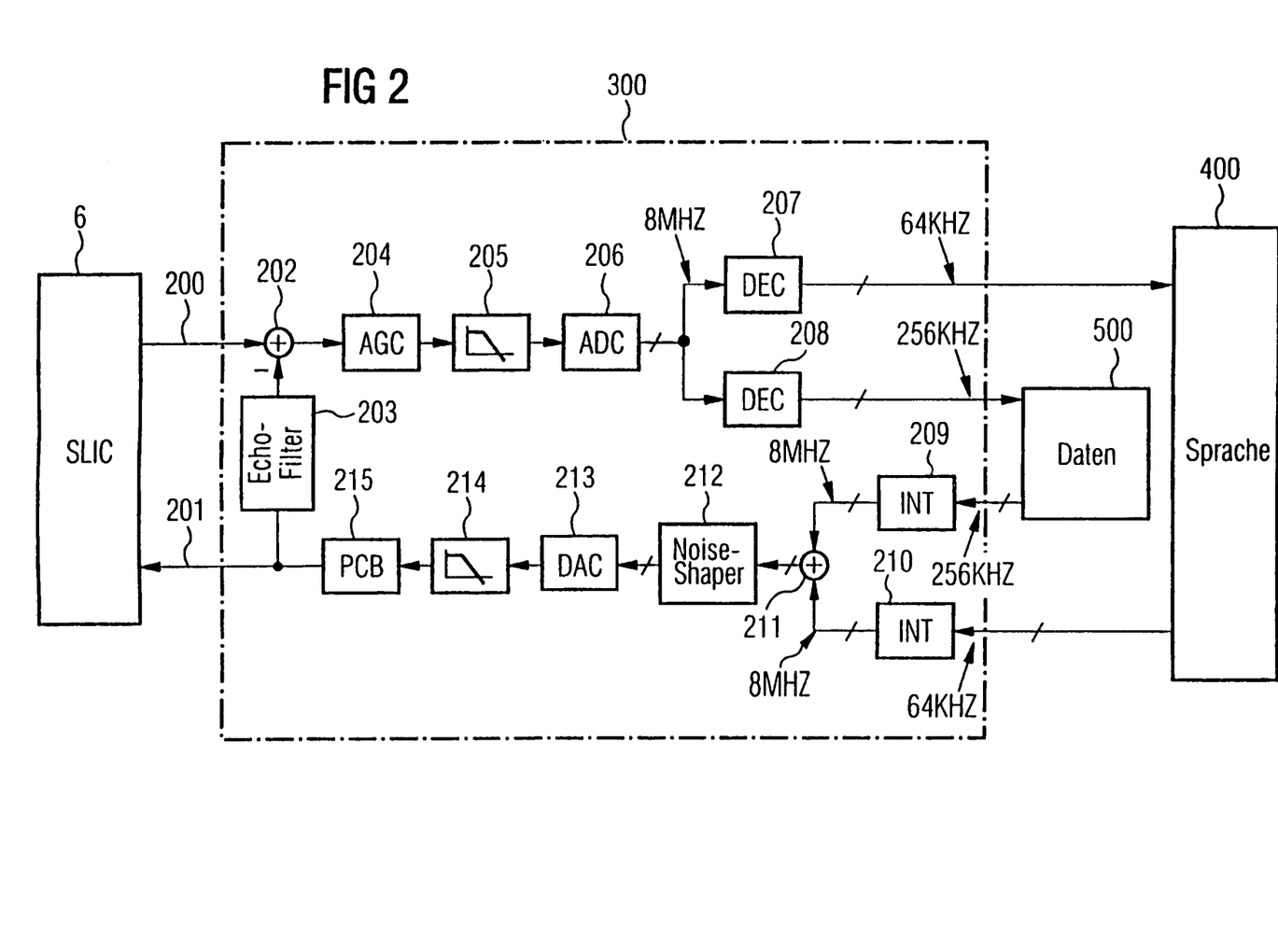
FIG. 2 shows a block diagram of a second illustrative embodiment of the line terminating device according to the invention.

The illustrative embodiments shown in FIGS. 1 and 2 show the application of the line terminating device according to the invention by way of example in the exchange. However, the line terminating device can also be applied at the subscriber's premises.

In FIG. 1, a subscriber transmits and receives both a narrowband audio-frequency voice signal with an analogue subscriber terminal 2 which can be, for example, a telephone or a voice band modem, and a broadband higher-frequency data signal with a digital subscriber terminal 3 which can be, for example, a computer with an ADSL modem, via a subscriber line 4 which consists of a twin copper wire, to an exchange. For this purpose, the analogue subscriber terminal 2 and the digital subscriber terminal 3 are in each case connected via a two-wire line to a first subscriber connection 1 (ATU-R=ADSL Transmission Unit-Remote), the first subscriber connection 1 being connected to the subscriber line 4.

In the exchange, the subscriber line 4 is connected to a second subscriber connection 5 (ATU-C=ADSL Transmission Unit-Central). The second subscriber connection 5, in turn, is connected via a two-wire line to a subscriber line interface circuit 6 (SLIC). The subscriber line interface circuit 6 is used for electrical matching to the subscriber line 4 and acts as hybrid circuit for the bidirectional subscriber line 4.

The subscriber line interface circuit 6 is connected to a line terminating device 100 which has an analogue/digital converter 7 (ADC), a digital/analogue converter 8 (DAC) and a digital POTS splitter 9.

In a first transmission direction (direction of reception for the line terminating device), a broadband analogue signal is converted to a received digital signal by the analogue/digital converter 7 in the line terminating device 100. An oversampling sigma/delta analogue/digital converter is preferably used for this purpose since only simple antialiasing filters of low order are needed for band limiting.

The analogue/digital converter 7 is followed by a first digital low-pass filter 10 and a first digital high-pass filter 11 in parallel in a digital POTS splitter 9. The filter function can be adjusted by programming the filter coefficients. If the first digital low-pass filter 10 and the first digital high-pass filter 11 are in the form of a program in a digital signal processor, the order of the filter can also be adjusted, in contrast to a hard-wired digital filter, by changing the program, in which only the filter coefficients are adjustable.

The first digital low-pass filter 10 filters a first digital voice signal out of the output signal of the analogue/digital converter 7. The first digital high-pass filter 11 filters a first digital data signal out of the output signal of the analogue/digital converter 7.

The first digital voice signal and the first digital data signal are then supplied to a digital voice processor 12 or digital data processor 13, respectively, which processes the first digital voice signal and the first digital data signal, respectively, and feeds it into a digital voice network 14 and, respectively, a digital data network 15. The digital voice network 14 and the digital data network 15 connect corresponding exchanges to one another.

In a second transmission direction (direction of transmission for the line terminating device), the digital voice processor 12 and the digital data processor 13 receive a second digital voice signal and a second digital data signal, respectively, via the digital voice network 14 and the digital data network 15, respectively.

The digital voice processor 12 and the digital data processor 13 supply the second digital voice signal and second digital data signal, respectively, to a second digital low-pass filter 17 and a second digital high-pass filter 16, respectively, in the digital POTS splitter filter 9.

In this arrangement, the second digital low-pass filter 17 and the second digital high-pass filter 16 can be adjusted by programming the filter coefficients. If the second digital low-pass filter 17 and the second digital high-pass filter 16 are in the form of a program in a digital signal processor, the order of the filter can also be adjusted, in contrast to a hard-wired digital filter, by changing the program, in which only the filter coefficients are adjustable.

After the filtering, the digital voice signal and the digital data signal are added in a digital adder 18 to form a digital transmit signal and are supplied to the digital/analogue converter 8.

The digital/analogue converter 8 converts the digital transmit signal into an analogue broadband transmit signal which is supplied to the subscriber line interface circuit 6 for transmission via the subscriber line 4.

Figure 3A:
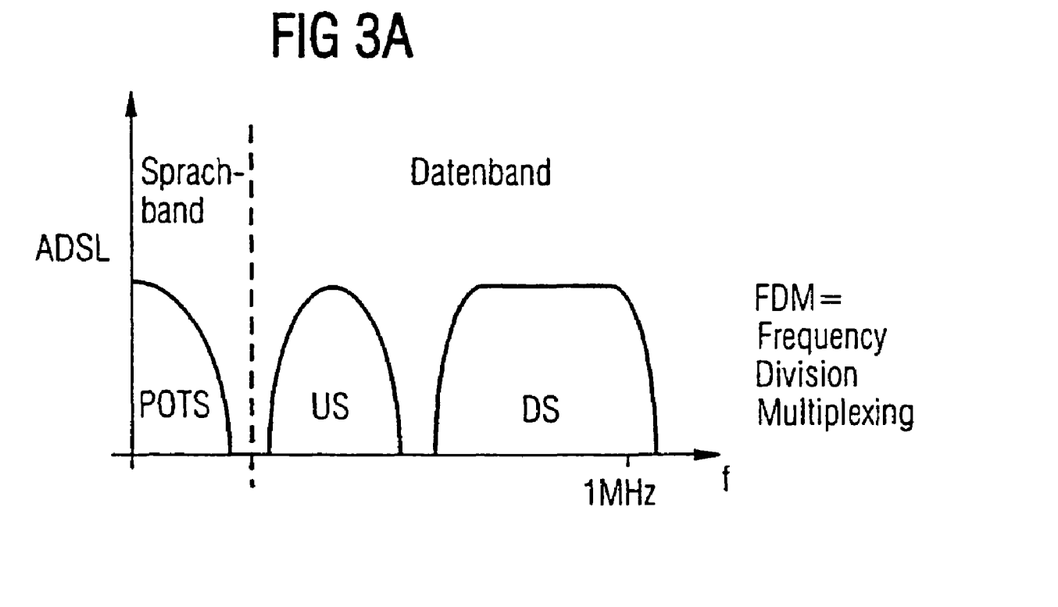
FIG. 3A shows a first diagram with the spectral distribution of voice and data bands.
Figure 3B:
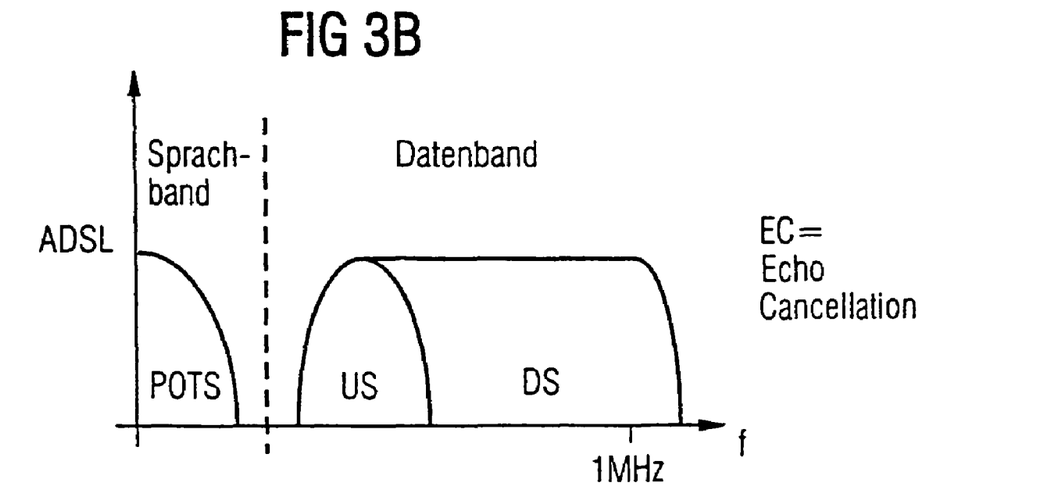
FIG. 3B shows a second diagram with the spectral distribution of voice and data bands.

The spectral distribution on the subscriber line 4 with a transmission using the ADSL method is shown in FIG. 3A and FIG. 3B.

The transmission bandwidths of a twin copper wire (two-wire line) is approx. 1.1 MHz. The voice band (POTS) is in a lower frequency range beginning diagrammatically at 0 Hz. Above the voice band, the data band begins which is divided into a first US frequency band and a second DS frequency band. In the first US (upstream) frequency band, data are transmitted from a subscriber into an exchange; in the second DS (downstream) frequency band, data are transmitted from the exchange to the subscriber. The upstream frequency band is narrower than the downstream frequency band.

The distribution of the data band into two separate frequency bands shown in FIG. 3A and data transmission in two separate US, DS frequency bands is called frequency division multiplexing (FDM). FIG. 3B also shows the spectral distribution of the narrowband voice band POTS and of the broadband data band in the ADSL data transmission method, the data band having a coherent frequency band which has both the upstream frequency band US and the downstream frequency band DS. Since the upstream and the downstream frequency bands are partially superimposed, echo cancellation (EC) must be used for separating the upstream and downstream frequency bands. The advantage with data transmission using echo cancellation is a wider downstream frequency band, as a result of which a higher data rate becomes possible from the exchange to the subscriber.

In the illustrative embodiments shown in FIGS. 3A and 3B, the POTS voice band and the ADSL data band are in each case completely separate from one another, that is to say the frequency bands do not overlap. Naturally, however, it would also be conceivable if voice and data bands slightly overlap, for example at their upper and lower cut-off frequency, respectively.

FIG. 2 shows a block diagram of a second illustrative embodiment of the line terminating device for a subscriber line.

The line terminating device 300 is connected to the subscriber line interface circuit 6 via a receive line 200 and a transmit line 201.

A received broadband signal which is supplied to the line terminating device 300 via the receive line 200 from the subscriber line interface circuit 6 is supplied to an analogue adding circuit 202. The analogue adding circuit 202 subtracts from the received signal a transmit signal which is contained in the received signal and which effects echo cancellation. For this purpose, the transmit signal is filtered by an echo filter 203. The echo filter 203 filters out the analogue voice signals contained in the transmit signal by means of high-pass filtering. The voice signals are thus not subjected to the echo cancellation. The echo filter 203 filters with a transfer function which corresponds to the transfer function of the connected twin copper wire. The signal present at the output of the echo filter 7 thus corresponds to an echo signal of the transmit signal which is contained in the received signal and is subtracted from the received signal by the analogue adding circuit 202.

The analogue adding circuit is followed by an automatic gain control (AGC) 204. At the input of the [lacuna], the voice signal which is not echo cancelled and the echo-cancelled data signal are present. The automatic gain control 204 controls the amplitude of the partially echo-cancelled received signal for further processing in such a manner that frequencies of the data band which have a low spectral power are amplified.

The automatic gain control 204 is followed by an anti-aliasing filter 205 for band limiting, which filters out all frequencies above the upstream frequency band of the data band in accordance with the sampling rate of a downstream analogue/digital converter.

The antialiasing filter 205 is followed by an oversampling sigma/delta analogue/digital converter 206 which converts the echo-cancelled, amplitude-controlled and band-limited received signal into a received digital signal represented by a 1-bit data stream with a sampling rate of 8 MHz.

The received signal is supplied to a first decimation filter 207 and, in parallel, to a second decimation filter 208.

The first decimation filter 207 performs digital low-pass filtering on the received digital signal and then reduces the sampling rate from 8 MHz by decimation to a sampling rate of 64 kHz, so that a 1-bit datastream with 64 kHz sampling rate (64 kbit/s datastream) is present at the output of the first decimation filter 207. This 64 kbit/s datastream is suitable for further voice processing and feeding into the digital voice network. The cut-off frequency of the digital low-pass filtering is set in such a manner that the data band is filtered out of the received digital signal and only the voice band remains. The 64 kbit/s datastream present at the output of the first decimation filter 207 is then supplied to a digital voice processing facility 400.

The second decimation filter 208 also performs low-pass filtering on the received digital signal and then reduces the sampling rate from 8 MHz to a sampling rate of 256 kHz so that a 1-bit datastream with 256 kHz (256 kbit/s datastream) is present at the output of the second decimation filter 208. The cut-off frequency of the low-pass filtering is above the highest frequency of the data band. The 256 kbit/s datastream present at the output of the second decimation filter 208 is supplied to a data processing facility 500 for further processing. The data processing facility 500 can supply the 256 kbit/s datastream to a high-pass filter to filter out remainders of the digital voice signal which are still present.

The processing of a transmit signal by the line terminating device 300 is described in the text which follows.

A digital voice signal to be transmitted, represented by a 1-bit datastream having a sampling rate of 64 kHz is supplied by the voice processing facility 400 to a first interpolation filter 210 in the line terminating device 300. The first interpolation filter 210 increases the 64 kHz sampling rate of the digital voice signal to a sampling rate of 8 MHz for further processing.

A digital data signal to be transmitted, represented by a 1-bit datastream with 256 kHz is supplied by the data processing facility 500 to a second interpolation filter 209 in the line terminating device 300. The second interpolation filter 209 also increases the 256 kHz sampling rate of the digital data signal to the sampling rate of 8 MHz for further processing.

After the interpolation, the digital voice signal and the digital data signal have the same sampling rate of 8 MHz. Both signals are supplied to a digital adder 211 which generates a digital transmit signal by adding the digital voice signal and the digital data signal.

The digital transmit signal is supplied to a digital noise shaper filter 212 which suppresses quantization noises contained in the digital transmit signal. The noise shaper filter 212 also matches the word width of the digital transmit signal to the processing word width of a downstream digital/analogue converter 213.

The digital transmit signal thus filtered is then converted by the digital/analogue converter 213 into an analogue broadband transmit signal which is filtered by a low-pass filter 214 following the digital/analogue converter 213. The cut-off frequency of the low-pass filter 214 is above the highest frequency of the data band. The low-pass filter 214 filters interfering frequencies above the spectrum used for transmission.

Using a power cutback (PCB) circuit 215 following the low-pass filter 214, the power spectrum distribution of the broadband transmit signal is cut back for further processing in the subscriber line interface circuit 6 to which the broadband transmit signal is supplied via the transmit line 201. The spectral power of the broadband transmit signal is cut back, especially in the case of short line lengths of the subscriber line, in order to limit the power loss and avoid modulation problems.

Figure 4:
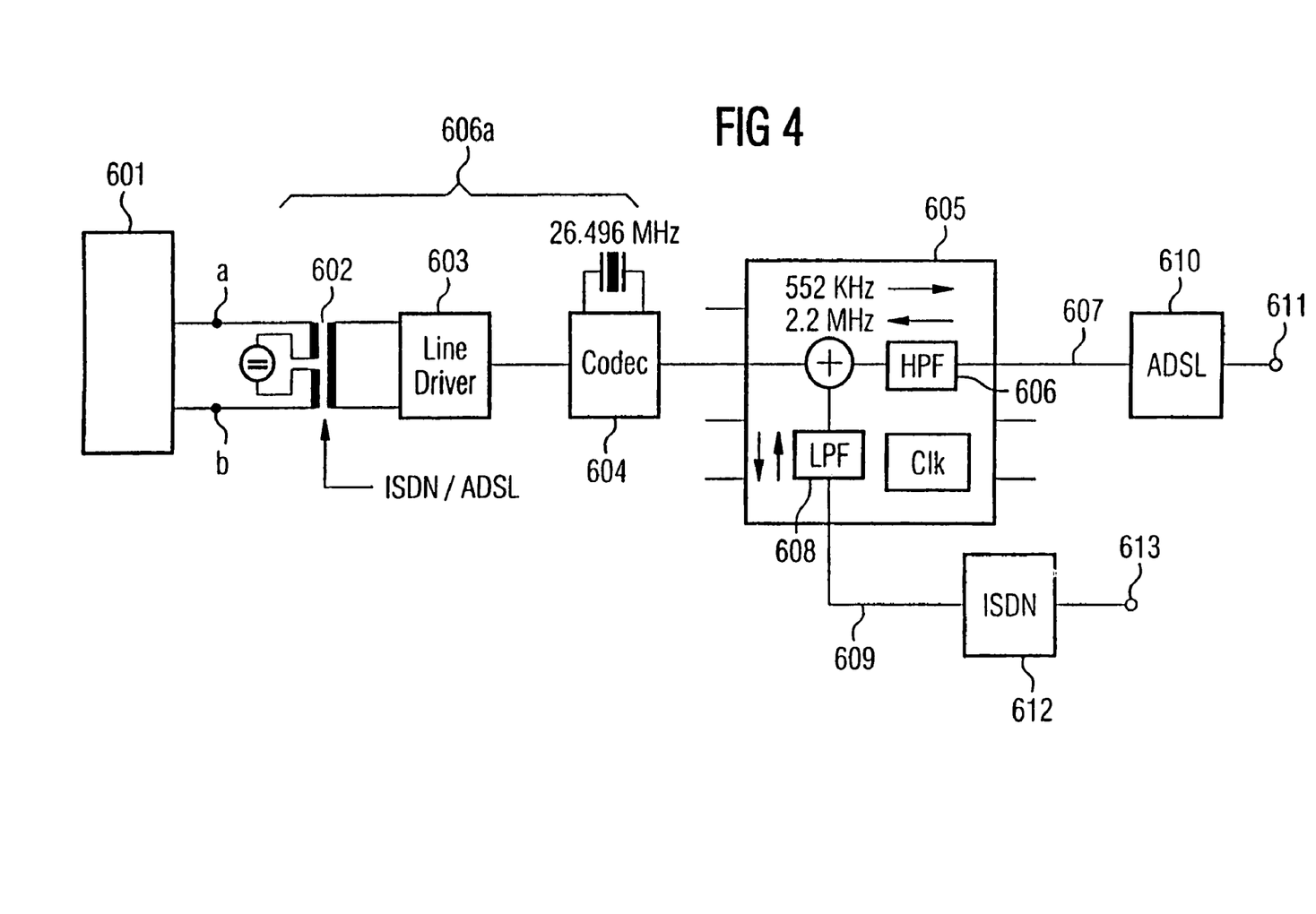
FIG. 4 shows a basic circuit of a line terminating device for a subscriber line comprising a digital splitter circuit which, in particular, is suitable for separating the ISDN voice band and the ADSL data band.

FIG. 4 shows the basic circuit of a line terminating device for a subscriber line comprising a digital splitter circuit which, in particular, is suitable for splitting the ISDN voice band and the ADSL data band.

The line terminating device is connected to the telephone network 601 via two copper wires a, b. Voice and data signals are coupled into the line terminating device via these twin copper wires of the POTS via an ISDN/ADSL transformer 602. This transformer 602 is connected to a digital ISDN splitter circuit (DISC) 605 via a line driver 603 and a codec 604. The codec 604 is clocked by a clock of 24.496 MHz supplied externally. The ISDN/ADSL transformer 2, the line driver 603 and the codec 604 form the common front end interface 606a of the line terminating device. In the present illustrative embodiment, only a single channel of the ISDN splitter circuit 605 has been shown in FIG. 4 but the ISDN splitter circuit 605 can be constructed as a multi-channel circuit as has also been indicated. Transformer 602, line driver 603, codec 604 and ISDN splitter circuit 605 can be advantageously integrated in a single chip or can also be implemented by means of a number of chip sets.

The ISDN splitter circuit 605 contains means for splitting the ADSL data and the ISDN voice data. A high-pass filter 606 is provided in the path 607 provided for the ADSL data and a low-pass filter 608 is provided in the path 609 provided for the ISDN voice data for this purpose. Furthermore, an ADSL transceiver module 610 is arranged between the ISDN splitter circuit 605 and the ADSL data interface 611. In addition, an ISDN transceiver module 612 is provided between the ISDN splitter circuit 605 and the PCM interface 613. In addition, means 614 for system clock generation and clock injection are also provided in the ISDN splitter circuit 605.

Figure 5:
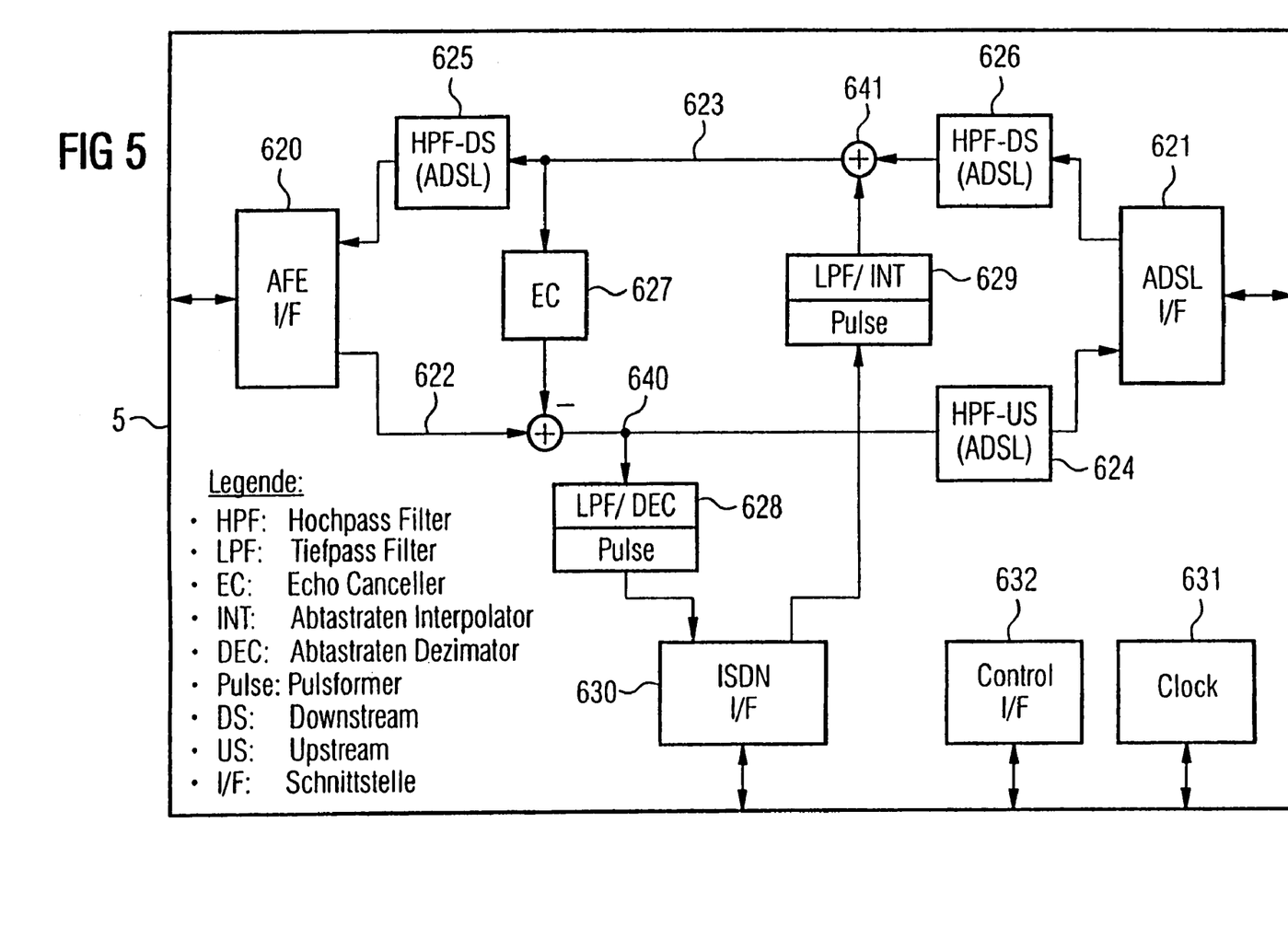
FIG. 5 shows the architecture of an advantageous illustrative embodiment of a digital splitter circuit for ADSL and ISDN according to FIG. 4.

FIG. 5 shows the architecture of an advantageous illustrative embodiment of the digital splitter circuit 5 according to the invention for ADSL and ISDN according to FIG. 4.

The interface of the analogue front end 620 is here connected to the ADSL interface 621 via an upstream signal path 622 and a downstream signal path 623 in each case. In each of these signal paths, at least one ADSL high-pass filter 624, 625, 626 is arranged. In addition, a so-called echo canceller 627 is provided between the two ADSL signal paths 622, 623. In FIG. 5, two ADSL high-pass filters 625, 626 are provided in each case in the downstream signal path 623, and it would also be conceivable to arrange only a single ADSL high-pass filter 625, 626 here. Its position could then be selected essentially freely before or after the echo canceller 627.

The echo canceller 627 in FIG. 5 which models the transmission behaviour at the subscriber end is used for coarse correction and can be typically trained only with common ADSL/ISDN operation. The ADSL and ISDN interfaces 621, 630 in each case have their own echo cancellers (not shown in FIG. 5) which are used for fine correction and which typically can be retrained with each new connection being set up.

The two ADSL signal paths 622, 623 are also in each case connected to the ISDN interface 630 via a low-pass filter circuit 628, 629. The low-pass filter circuit 628, which is arranged between the ISDN interface 630 and ADSL upstream signal path 622, is provided with a sampling rate decimator (DEC) and a downstream pulse shaper for reducing the pulse frequency for the downstream ISDN interface 630. The low-pass filter 628 is used for separating the ISDN data band from the ADSL data band at the splitting point 640. Conversely, the low-pass filter circuit 629 which is arranged between the ISDN interface 630 and the ADSL downstream signal path 623 is provided with a preceding pulse shaper and a sampling rate interpolator following the former. The low-pass filter circuit 629 is used for superimposing the ISDN voice band on the ADSL data band transmitted from the ADSL interface 621 in the downstream path 623 at summation point 640 and supplying it to the interface of the analogue front end 620.

In addition, the ISDN splitter circuit 605 according to the invention also has an interface 631 for clock injection and an interface 632 for control signal injection.

Naturally the ISDN splitter circuits 5 shown in FIGS. 4 and 5 can also be modified in a simple manner in such a manner that they are suitable for separating ADSL data and POTS voice instead of separating ADSL data and ISDN voice. Similarly, ADSL data has always been used as a basis in the preceding illustrative embodiment. Naturally, however, the present invention could be very advantageously applied to all conceivable xDSL transmission methods. To this end, the circuits according to FIGS. 4 and 5 would only have to be modified within the framework of knowledge available to an expert by suitably dimensioning, for example, the cut-off frequencies of the filters.

The present invention is particularly suitable for those line terminating devices which are suitable for implementing ADSL via ISDN or POTS services offered by various network operators such as Deutsche Telekom.

The invention claimed is:

1. Line terminating device for a subscriber line which transmits and receives broadband signals via a single subscriber line, a broadband signal being composed of a broadband or narrowband audio-frequency voice signal and a broadband higher-frequency data signal and the frequency bands of the voice signal and of the data signal essentially not overlapping, having a digital frequency separating filter which separates the audio-frequency voice signal and the higher-frequency data signal from each other, said digital frequency separating filter being in the digital section of the line terminating device and having a first digital low-pass filter and a first digital high pass filter, said line terminating device having a analog/digital converter which converts a broadband received signal into a digital received signal, and a digital/analog converter which converts a digital transmit signal into a broadband transmit signal, and the digital frequency separating filter follows the analog/digital converter and precedes the digital/analog converter and separates the digital received signal into a first digital voice signal and a first digital data signal and combines a second digital voice signal and a second digital data signal to form the digital transmit signal, the first digital low-pass filter and the first digital high-pass filter being supplied with the digital received signal, the digital frequency separating filter having a second digital low-pass filter, a second digital high-pass filter and a digital adder, the second digital voice signal being supplied to the second digital low-pass filter, the second digital data signal being supplied to the second digital high-pass filter and the digital adder adding the output signal of the second digital low-pass filter and of the second digital high-pass filter to form the digital transmit signal.

2. Line terminating device according to claim 1, characterized in that the first digital low-pass filter has a first series circuit of at least one first decimation filter and the first digital high-pass filter has a second series circuit of at least one second decimation filter.

3. Line terminating device according to claim 1, characterized in that the second digital low-pass filter has a third series circuit of at least one first interpolation filter and the second digital high-pass filter has a fourth series circuit of at least one second interpolation filter.

4. Line terminating device according to claim 1, characterized in that the digital frequency separating filter has a noise shaper filter which follows a digital adder.

5. Line terminating device according to claim 1, characterized in that an oversampling sigma/delta analogue/digital converter is provided as analog/digital converter.

6. Signal processing facility according to claim 1, characterized in that a first digital low-pass filter, a first digital high-pass filter, a second digital low-pass filter and a second digital high-pass filter are designed as programs in a digital signal processor.

7. Signal processing device according to claim 1, characterized in that the analog/digital converter is preceded by an automatic gain control circuit for controlling the amplitude of the received broadband analogue signal.

8. Signal processing device according to claim 1, characterized in that the digital/analog converter is followed by a power cutback circuit for cutting back the power spectrum distribution.

9. Line terminating device according to claim 1, characterized in that the broadband audio-frequency voice signal is an ISDN voice signal and the broadband higher-frequency signal is an ADSL data signal.

10. Line terminating device according to one of claim 1, characterized in that the broadband audio-frequency voice signal is a POTS voice signal and the broadband higher-frequency data signal is ADSL data signal.

11. Line terminating device according to claim 1, characterized in that the digital frequency separating filter is designed with a number of channels, in which arrangement in each case audio-frequency POTS and/or ISDN voice signals and broadband higher-frequency ADSL data signals can be transmitted via the multiplicity of channels.

12. Line terminating device according to claim 1, characterized in that the digital frequency separating filter has an echo canceller which is arranged both between an upstream signal path and a downstream path.

13. Line terminating device according to claim 12, characterized in that the echo canceller is provided for coarse correction and filters out an interference signal fed back by the digital frequency separating filter.

14. Line terminating device according to claim 12, characterized in that the echo canceller in the digital frequency separating filter can only be trained with a common operation of audio-frequency voice signal and higher-frequency data signal.

15. Line terminating device according to claim 12, characterized in that the interfaces to the transceiver circuits for the audio-frequency voice signal and higher frequency data signal and/or the transceiver circuits themselves have in each case at least one further echo canceller which is used for fine correction of the interference signal set back in each case.

16. Line terminating device according to claim 1, characterized in that in the digital frequency separating filter for separating the audio-frequency voice signal from the higher-frequency data signal, a low-pass filter circuit is provided which contains a sampling rate decimator and a pulse shaper following the latter and which is connected via an interface to a transceiver suitable for processing audio-frequency voice signals.

17. Line terminating device according to claim 1, characterized in that, in the digital frequency separating filter, a further low-pass filter circuit is provided which contains an upstream pulse shaper and a sampling rate integrator and which is connected via an interface to a transceiver suitable for processing audio-frequency voice signals, the low-pass filter circuit providing at its output the audio-frequency voice signal which is superimposed on the higher-frequency data signal.

18. Line terminating device according to claim 1, characterized in that the digital frequency separating filter, together with a transformer, a line driver circuit, and a coded circuit, are integrated on a single chip.

19. Line terminating device according to claim 1, characterized in that the digital frequency separating filter has at least one sampling rate adaptation stage and a clock synchronization unit which ensures that the sampling rates of the respective signal streams are equal magnitude at the summation point and at the splitting point.

* * * * *